Dec. 27, 1927.
R. E. OGDEN
BOLT ANCHOR
Filed Dec. 13, 1922
1,654,346
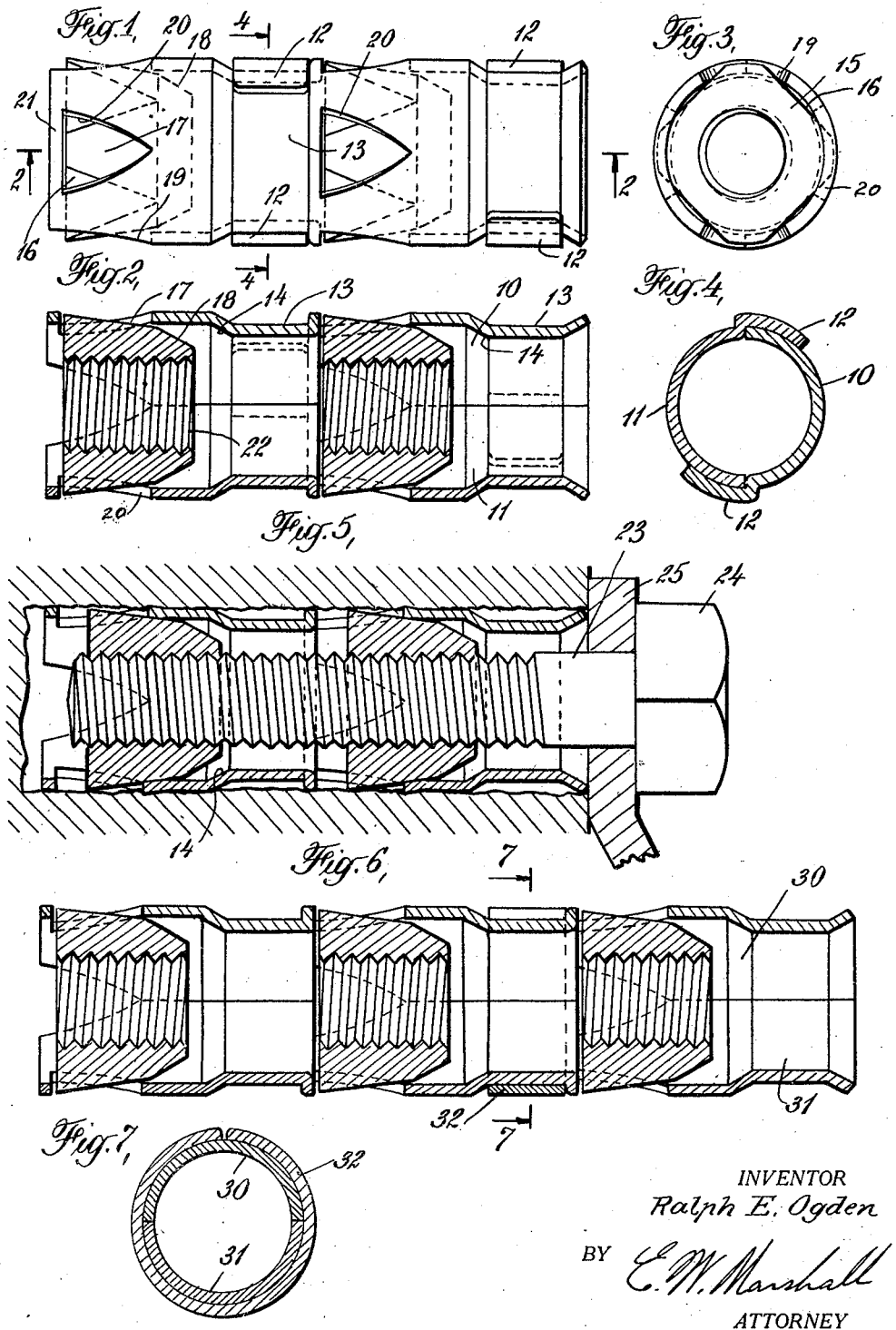
INVENTOR
Ralph E. Ogden
BY E. W. Marshall
ATTORNEY Patented Dec. 27, 1927.

1,654,346

UNITED STATES PATENT OFFICE.

RALPH E. OGDEN, OF MOUNTAINVILLE, NEW YORK, ASSIGNOR TO JOHN EDWARD OGDEN, OF MOUNTAINVILLE, NEW YORK.

BOLT ANCHOR.

Application filed December 13, 1922. Serial No. 606,596.

This invention relates to improvements in bolt anchors of the character employed for obtaining anchorage in walls of brick or stone or cementitious material not adapted to directly receive a threaded element or bolt.

One of the objects of the invention is to provide an anchorage in which the shield will be anchored at a plurality of points spaced longitudinally of the shield or longitudinally spaced in the depth of the drilled hole in which the shield is located.

Another object of the invention is to provide an anchorage so constructed and arranged as to rigidly hold the bolt and to prevent vibration of the bolt anchored thereby.

Another object of the invention is to provide a shield particularly adapted for use in forming anchorages in deep wall openings.

Further objects of the invention will appear from the following specification taken in connection with the drawings, which form a part of this application, and in which Fig. 1 is an elevational view of a bolt anchor constructed in accordance with the invention.

Fig. 2 is a sectional elevation taken substantially on line 2—2 of Fig. 1.

Fig. 3 is an end elevation of the inner end of the construction shown in Fig. 1.

Fig. 4 is a transverse sectional elevation taken substantially on line 4—4 of Fig. 1.

Fig. 5 is a sectional elevation showing the anchor illustrated in Figs. 1 to 4 mounted in a wall opening and partially expanded.

Fig. 6 is a sectional elevation of another form of the invention, and

Fig. 7 is a transverse sectional elevation taken substantially on line 7—7 of Fig. 6.

The invention briefly described consists of a bolt anchor comprising an expansion shield having a plurality of longitudinally spaced expansible portions and expanding elements or nuts for expanding the expansible portions of the shield. In the particular forms of the invention illustrated, these expanding elements operate simultaneously to expand the longitudinally spaced portions of the shield. Further details of the invention will appear from the following description.

The expansion shield may be formed in any desired manner and, as illustrated in the drawings, the shield comprises a pair of sheet metal sections 10 and 11, these members being held together by overlapping tabs 12 spaced longitudinally throughout the length of the shield. The tabs 12 seat in depressions 13 formed in the shield sections and these depressions, as shown in Figs. 2 and 5, form internal shoulders 14 which act as stops to limit the inward movement of the expanding elements.

The expanding element or nut may be of any desired shape and in the form illustrated the nut is substantially square at one end as shown at 15 and has flat faces 16. The nut is tapered longitudinally and the tapered faces 17 are disposed intermediate the flat faces 16. In the particular form of the invention shown, the end of the nut opposite the square end 15 is further tapered as shown at 18.

V-shaped notches 19 are formed between the sections 10 and 11 and receive opposite corners of the nut and the two remaining corners are received by triangular openings 20 formed in the sections 10 and 11. Each of the sections has a connecting portion 21 which forms the base of the triangular opening and these connecting portions overlap the end of the expanding element or nut and retain the element in the shield.

As clearly shown in Figs. 1 and 2, the V-shaped notches and triangular openings are formed at the inner end of the shield and also substantially at the longitudinal central portion of the shield and, therefore, the notches and openings have been indicated by like reference characters in both positions thereof.

In the form of the invention shown in Figs. 1 to 5 a pair of expanding elements or nuts is used, these nuts being threaded internally as shown at 22 to receive a bolt 23 or other threaded element.

From the showing in Fig. 5 it will be seen that as the bolt 23 is rotated, after the head 24 of the bolt has engaged the object 25 to be secured, the expanding elements or nuts will travel longitudinally in the shield, thereby expanding the shield into a firm, gripping engagement with the walls of the bore of the opening in which the shield is positioned.

The construction shown in Figs. 6 and 7 is similar to that already described but differs therefrom in that the shield has three expansible portions and three expanding elements or nuts. The two shield sections 30 and 31 are in this instance held together by a split ring 32 instead of by the tabs 12 as in the other embodiment.

It will be evident that the tabs 12 and the split ring 32 form an excess of metal on the outer surface of the shield and that this excess metal will be forced into gripping engagement with the bore of the opening if the expanding nuts are drawn into the shield a sufficient distance.

With the embodiment of the invention shown in Figs. 6 and 7 the rotation of the bolt will cause all three nuts to move simultaneously into the shield, thereby expanding the three expansible portions.

From the foregoing description it will be evident that a very firm and secure anchorage has been designed and that by anchoring the shield at a plurality of longitudinally spaced points a particularly rigid construction will be provided. Furthermore, vibration of the bolt or other threaded element anchored by the shield will be effectively prevented.

Although certain specific embodiments of the invention have been shown and described, it will be understood that the invention is capable of modification and that further changes in the construction and in the arrangement of the various cooperating parts may be made without departing from the spirit or scope of the invention as expressed in the following claims.

What I claim is:

1. In combination, a longitudinally rigid, non-contractable expansion shield and a plurality of longitudinally spaced independent expanding elements in said shield extending through openings therein, said shield and elements being so relatively constructed and arranged that said elements will operate simultaneously in the same direction to engage the inner surface of the shield and force the shield outwardly.

2. In combination, a longitudinally rigid, non-contractable expansion shield having a plurality of longitudinally spaced expansible portions, means for radially expanding each of said portions, said expanding means being operable in the same direction to engage the inner surface of the shield and force the expansible portions thereof outwardly.

3. In combination, a longitudinally rigid, non-contractable expansion shield having a plurality of longitudinally spaced, expansible portions and separate means for radially expanding each of said portions, all of said expanding means being operable in the same direction to engage the inner surfaces of the expansible portions and force said portions outwardly into expanded position.

4. In combination, an expansion shield having a plurality of longitudinally spaced, expansible portions and separate, simultaneously operable threaded means for expanding each of said portions, said expanding means being operable in the same direction to engage the inner surfaces of said expansible portions and expand the shield outwardly.

5. In combination, an expansion shield having a plurality of longitudinally spaced, expansible portions and internally threaded means for expanding each of said portions, all of said expanding means being operable in the same direction to engage the inner surfaces of the expansible portions and force the shield outwardly into expanded position.

6. In combination, an expansion shield having a plurality of longitudinally spaced expansible portions and separate internally threaded simultaneously operable means movable into the shield to engage the inner surfaces of the expansible portions and force said portions outwardly into expanded position.

7. In combination, a longitudinally rigid, non-contractable expansion shield and a plurality of independent longitudinally spaced tapered expanding elements in said shield adapted to travel in the same direction and to engage the inner surface of the shield and force the shield outwardly into expanded position.

8. In combination, a longitudinally rigid, non-contractable expansion shield having a plurality of longitudinally spaced expansible portions and an independent tapered expanding element for each expansible portion, said expanding elements being movable in the same direction to engage the inner surfaces of the expansible portions and force said portions outwardly into expanded position.

9. In combination, an expansion shield having a plurality of longitudinally spaced expansible portions, a separate, tapered, threaded expanding element for each expanding portion adapted to engage the inner surface of said expansible portion and force said portion outwardly and means for simultaneously actuating said expanding elements in the same direction.

10. In combination, an open ended expansion shield and an expanding nut, angular in section, said shield having triangular openings therethrough for receiving corners of the nut and having portions extending across portions of the end of the nut.

11. In combination, an open ended expansion shield and an expanding nut, angular in section, said shield having triangular openings therethrough for receiving corners of the nut, the bases of the triangular openings extending across end portions of the nut.

12. In combination, an open ended expansion shield and an expanding nut, angular in section, said shield having a substantially triangular opening adjacent the end thereof for receiving a corner of the nut and the base of said triangular opening extending across an end portion of the nut, thereby retaining the nut in the shield.

In witness whereof, I have hereunto set my hand this 2nd day of December, 1922.

RALPH E. OGDEN.